United States Patent [19]

Brandt

[11] 4,014,222

[45] Mar. 29, 1977

[54] VARIABLE SPEED AND DIRECTION TRANSMISSION PRIME MOVER SYSTEM

[76] Inventor: James B. Brandt, P.O. Box 21, Sullivan, Wis. 53178

[22] Filed: Jan. 8, 1975

[21] Appl. No.: 539,276

[52] U.S. Cl. .................................. 74/687; 74/789; 74/793

[51] Int. Cl.² .................. F16H 47/04; F16H 57/10

[58] Field of Search ......... 74/665 C, 665 A, 665 D, 74/789, 793, 687, 688

[56] References Cited

UNITED STATES PATENTS

| | | | |
|---|---|---|---|
| 1,715,778 | 6/1929 | Orr | 74/789 |
| 1,903,635 | 4/1933 | Saives | 74/789 |
| 2,579,368 | 12/1951 | Curtis et al. | 74/789 |
| 2,668,460 | 2/1954 | Butterfield et al. | 74/792 |
| 2,969,696 | 1/1961 | Fraga | 74/789 |

FOREIGN PATENTS OR APPLICATIONS

| | | | |
|---|---|---|---|
| 1,120,164 | 1/1955 | France | 74/789 |
| 692,244 | 3/1930 | France | 74/789 |
| 1,209,835 | 1/1966 | Germany | 74/665 E |
| 440,188 | 3/1948 | Italy | 74/789 |

Primary Examiner—Samuel Scott
Assistant Examiner—Lance W. Chandler
Attorney, Agent, or Firm—Alter and Weiss

[57] ABSTRACT

A power transmission apparatus comprising planetary gear elements for controlling the direction and speed of power transmitted to a driven power unit, such as a vehicle, industrial machines, household equipment, or the like. In one embodiment of the invention, power from a constant speed, uni-directional prime mover is converted to multi-speed forward and reverse power by controlling only the movement of the planetary carrier. In a variation of this embodiment of the invention, a variable speed uni-directional prime mover is converted into a speed division torque-multiplication system by control of the carrier by a torque control device, such as a torque converter, or mechanical torque limited. In yet another embodiment, control of the carrier and associated clutch mechanisms permits one of two output power paths from the transmission to be reversed while the first path continues to rotate in the same direction as the prime mover.

12 Claims, 10 Drawing Figures

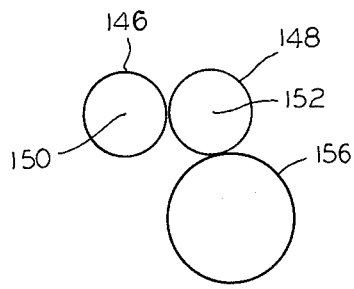

FIG. 8

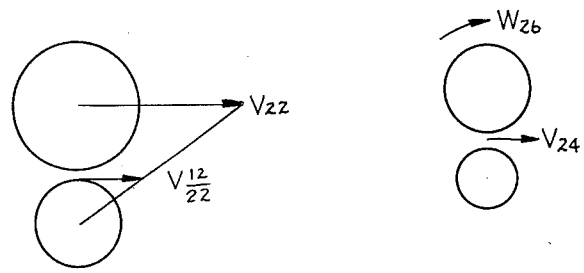

$$W\tfrac{16}{12} = V\tfrac{12}{r_{16}} = -\frac{W_{12}\, r_{12}}{r_{16}} \quad (W_{22}=0)$$

$$W\tfrac{16}{22} = W\tfrac{16}{22} + W\tfrac{16}{12}$$

$$W\tfrac{16}{22} = \frac{V\tfrac{12}{22}}{r_{16}} = V_{22}\frac{r_{12}}{r_{22}\, r_{16}} \quad (W_{12}=0)$$

$$= W_{22}\frac{r_{22}\, r_{12}}{r_{22}\, r_{16}} = W_{22}\frac{r_{12}}{r_{16}}$$

$$W_{16} = W_{22} + W\tfrac{16}{22} + W\tfrac{16}{12} = W_{22} + W_{22}\frac{r_{12}}{r_{16}} - W_{12}\frac{r_{12}}{r_{16}}$$

$$W_{20} = W_{16}$$

$$W_{26} = W_{22} + W_{26}\, due\, to\, 12 = W_{22} + W_{12}\, Ratio + W\tfrac{12}{22}\, Ratio$$

$$\left.\begin{array}{l} V_{12} = W_{12}\, r_{12} \\ W_{16} = \dfrac{V_{12}}{r_{16}} = W_{12}\dfrac{r_{12}}{r_{16}} = W_{20} \\ V_{26} = W_{26}\, r_{24} = W_{12}\dfrac{r_{12}\, r_{24}}{r_{16}} \\ W\tfrac{26}{12} = \dfrac{r_{20}}{r_{24}} = +W_{12}\dfrac{r_{12}\, r_{24}}{r_{16}\, r_{24}} \end{array}\right\} (W_{22}=0)$$

$$W\tfrac{24}{22} = W_{22} + W\tfrac{24}{12,22}$$

$$\left.\begin{array}{l} V_{16} = V_{22}\dfrac{r_{12}}{r_{22}} = W_{22}\dfrac{r_{22}\, r_{12}}{r_{22}} = W_{22}\, r_{12} \\ W_{16} = \dfrac{V_{16}}{r_{16}} = W_{22}\dfrac{r_{12}}{r_{16}} = W_{20} = W_{16} \\ \dfrac{V_{24}}{12,22} = W_{26}\, r_{20} = W_{22}\dfrac{r_{12}}{r_{16}}\, r_{20} \\ W_{26} = -\dfrac{V_{26}}{\tfrac{12,22}{r_{24}}} = -W_{22}\dfrac{r_{12}\, r_{20}}{r_{16}\, r_{24}} \end{array}\right\} (W_{12}=0)$$

$$W_{26} = W_{22} - W_{22}\frac{r_{12}\, r_{20}}{r_{16}\, r_{24}} + W_{12}\frac{r_{12}\, r_{20}}{r_{16}\, r_{24}}$$

FIG. 9

VARIABLE SPEED AND DIRECTION TRANSMISSION PRIME MOVER SYSTEM

The present invention relates to geared drive mechanisms, and in particular to planetary type gear drive mechanisms for varying the speed and/or direction of an output shaft while driving an input shaft at a constant speed.

In many power applications, where an engine or motor drives a power shaft at a constant speed, auxiliary power take-off units are employed to operate various servo-mechanisms associated with the device operated by the engine or motor. Usually, these servo-mechanisms must be driven at different speeds relative to the main power drive depending upon their function. Heretofore, separate power means have been employed to drive these servo-mechanisms, requiring the use of additional power sources, and increased fuel consumption.

Therefore, a primary object of my invention is to provide a drive mechanism adapted to operate a device in forward or reverse, and at an infinite number of speeds from a uni-directional, constant speed input, thereby providing necessary torque distribution.

An additional feature of my invention is to provide a servo-planetary gear system for converting a constant speed drive to a variable speed, multi-directional drive.

Yet another object of my invention is to provide several embodiments of planetary gear drive units which provide high torque-low variable speed, or low torque-high variable speed drive capabilities to a servo-mechanism driven by a constant speed power source.

Still another object of several embodiments of my invention is to provide a direction reversal power unit, capable of reversing the direction of a single input, dual output gear mechanism without the loss of power through the mechanism, other then conventional losses resulting with gear meshes, friction windage, fluid flow, incomplete combustion and the like.

Another primary objective of my invention is to provide a variable speed, prime mover, seroplanetary, gear system that responds under increasing load so as to decrease speed while multiplying torque. Such a system provides increasing torque to the load with reduced lugging of the prime mover. This is accomplished with a torque-responding unit such as a torque converter, mechanical torque limiter, or the like, when such a unit is operably connected between the prime mover and the planetary carrier and/or pinion.

In particular, several embodiments of my invention include planetary gear mechanisms driven by a single power shaft connected to an input gear, and a variably driven shaft connected to an output gear. The input and output gears are interconnected by a series of planetary gear units mounted in a carrier on rotatable axes. The carrier itself is rotatable about a central axis, and the direction and speed of rotation of the carrier is controlled by a variable speed, multi-directional drive unit, such as an electric motor, hydrostatic pump-motor mechanism, torque converter, or the like. The speed and direction at which the drive unit is driven determines the speed and direction of the output shaft, even though the input shaft maybe driven at a constant speed in one direction.

In alternate embodiments of my invention, a planetary gear mechanism provides dual output power paths which may be selectively and independently coupled to a single input power source. When desired, one of the paths may be disengaged from the input source, and driven in a reverse direction. This is accomplished by holding the planetary carrier against rotation while one of the output paths is disengaged from the power source.

These and other objects of my invention will become apparent when read in conjunction with the following detailed description and accompanying drawings in which:

FIG. 8 is a schematic side view taken along line 8—8 of FIG. 4.

FIG. 9 is a mathematical diagram showing the relationship between the various elements of the transmission of FIG. 1.

Figure 1:
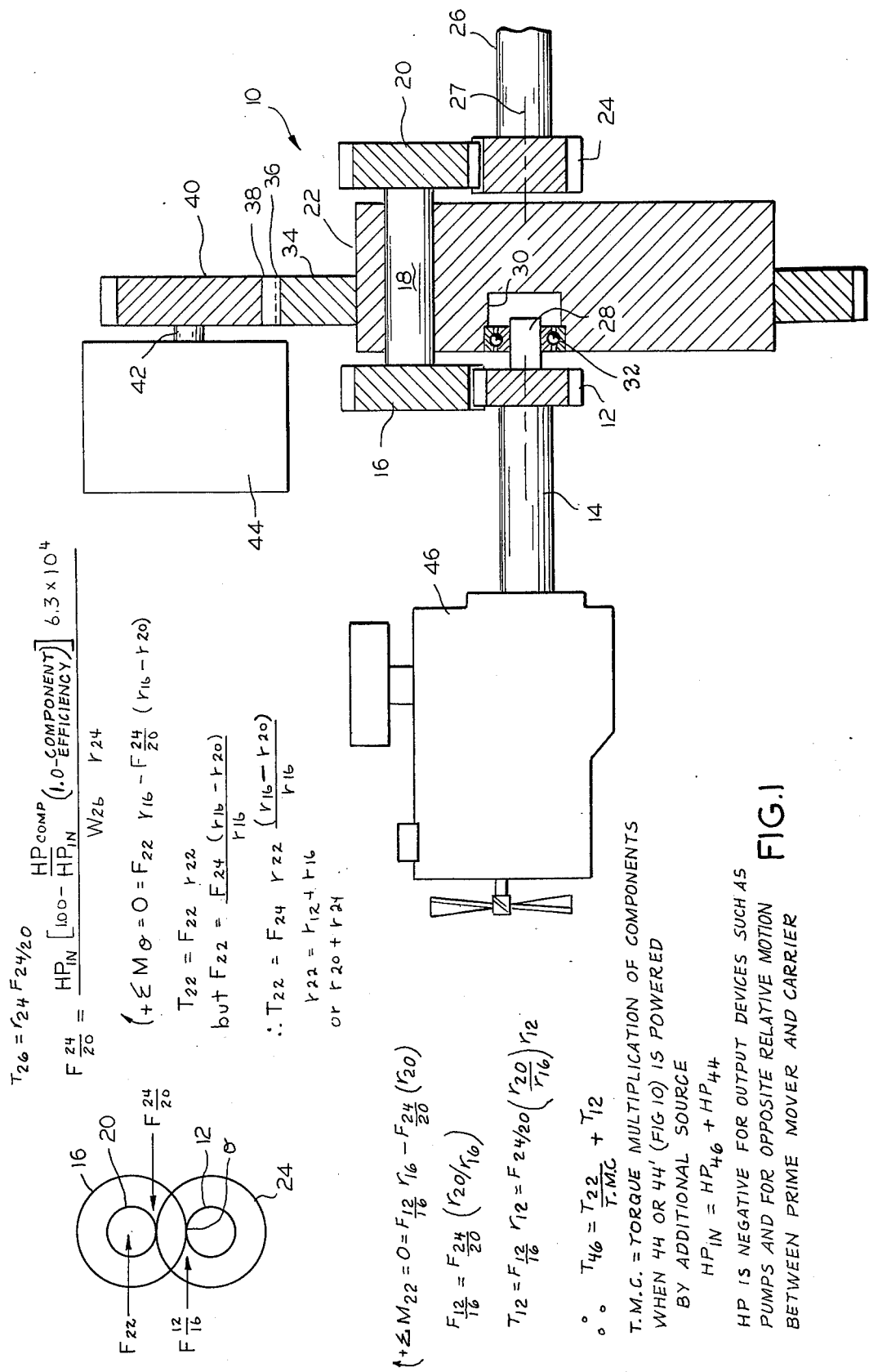
FIG. 1 is a schematic illustration of a system including a planetary drive mechanism and power source arrangement constructed in accordance with my invention.

Similar characters of reference in the respective drawings indicate corresponding parts and features constituting my invention. Referring to FIG. 1, the system, including a planetary transmission constructed in accordance with my invention is schematically illustrated with the transmission generally designated by the numeral 10. The transmission 10 includes a first spur gear 12 mounted for rotation with a shaft 14. Gear 12 may be attached to shaft 14 by means of a splined connection, a slot-key configuration, a set screw, or any other equivalent means. Mating with gear 12 is a first planet gear 16 similarly mounted for rotation with shaft 18. A second planet gear 20 is mounted on the outer end of shaft 18 for rotation therewith. Shaft 18 is held by planet carrier 22 and is mounted for rotation with respect thereto. Second planet gear 20 meshes with a second spur gear 24, which is mounted for rotation with output shaft 26. Planet carrier 22 is adapted to rotate about its central axis, designated by line 27, by means of support devices not shown in the schematic diagram of FIG. 1.

One end of shaft 14 includes a portion 28 of lesser diameter which is journaled for rotation in a cut-out portion 30 of planet carrier 22 by means of ball bearings 32. Thus, shaft 14 and carrier 22 are capable of independent rotation relative to each other.

Carrier 22 is substantially circular and an annular member 34 is rigidly fixed on the circumference of the carrier. The outer edge of annular member 34 comprises gear teeth 36 which mesh with corresponding gear teeth 38 on gear 40. Gear 40 is mounted for rotation with shaft 42, the direction and speed of which is controlled by control unit 44. The control unit 44 may comprise a hydraulic circuit, such as a hydrostatic pump-motor unit or hydrodynamic unit, an electric circuit, an internal combustion engine, a torque converter, torque limiter, a clutch system, or any power means which controls the speed and direction of rotation of shaft 42 as desired by an operator.

To operate the transmission of FIG. 1, power is supplied to rotate shaft 14 for example, power may be supplied by the constant speed engine 46 with part of its power imparted to a hydrostatic unit, or may be supplied by a variable speed prime mover with part of its power imparted to a hydrodynamic unit by means of a prime mover, shown here as a constant speed internal combustion engine 46, although it is understood that any source of power may be used to drive shaft 14. For purposes of discussion, it is assumed that shaft 14 is driven at a constant speed, however, this is not absolutely necessary for the functioning of my invention.

As shaft 14 rotates, spur gear 12 connected thereto also rotates, driving first planet gear 16. If control unit 44 is in a neutral or fixed mode, gear 40 is held immobile, thereby preventing planet carrier 22 from rotating. Shaft 18 then rotates about its own axis, delivering power to gears 20, 24, and to output shaft 26. The speed of shaft 26 is ($W_{26}$) determined by the relative gear tooth ratios between gears 12, 16 and gears 20, 24 is accordance with the following formulas:

$$W_{26} = W_{22}\left(1 - \frac{r_{12}r_{20}}{r_{16}r_{24}}\right) + W_{14}\left(\frac{r_{12}r_{20}}{r_{16}r_{24}}\right)$$

and $$T_{22} = F_{24}r_{22}\left(\frac{r_{16} - r_{20}}{r_{16}}\right),$$

Where:  $T$ = torque
         $F$ = force
         $r$ = pitch radius of gear
and      $r_{22} = r_{12} + r_{16}$
(subscript numerals refer to gear designations in FIG. 1)

$W$ is positive for common direction and $W$ is negative for opposite directions. Shaft 26 is usually driven in the same direction as shaft 14.

The particular system of FIG. 1 with hydrostatic device 44 is adapted to drive shaft 26 at variable output speeds, while the speed and direction of rotation of shaft 14 remains substantially constant. To this end, control unit 44 is provided with operating means (not shown) to drive gear 40 at different speeds, and in either a clockwise or counterclockwise direction. Control unit 44 may be relatively small compared to engine 46 and power is directly proportional to the degree of speed control or magnitude of torque required, depending on which is the principle parameter, since unit 44 need only be powerful enough to control planet carrier 22. In yet another embodiment as shown in FIG. 10, hydrostatic unit 44 can be directly coupled to carrier 22 by replacement with hydrodynamic unit 44' which functions as a directly attached and integrated torque conversion device.

When control unit 44 is activated to rotate carrier 22, the relative motion between gears 12, 16 and gears 20, 24 changes, thereby driving shaft 26 at different speeds. The actual speed of shaft 26 will be a function of the rotative speed of carrier 22 and the relative ratios between gears 12, 16 and gears 20, 24 as well as the speed of prime mover 46. With increased power input to carrier 22, the range of speed thru which shaft 26 may be driven can be substantially increased.

Figure 10:
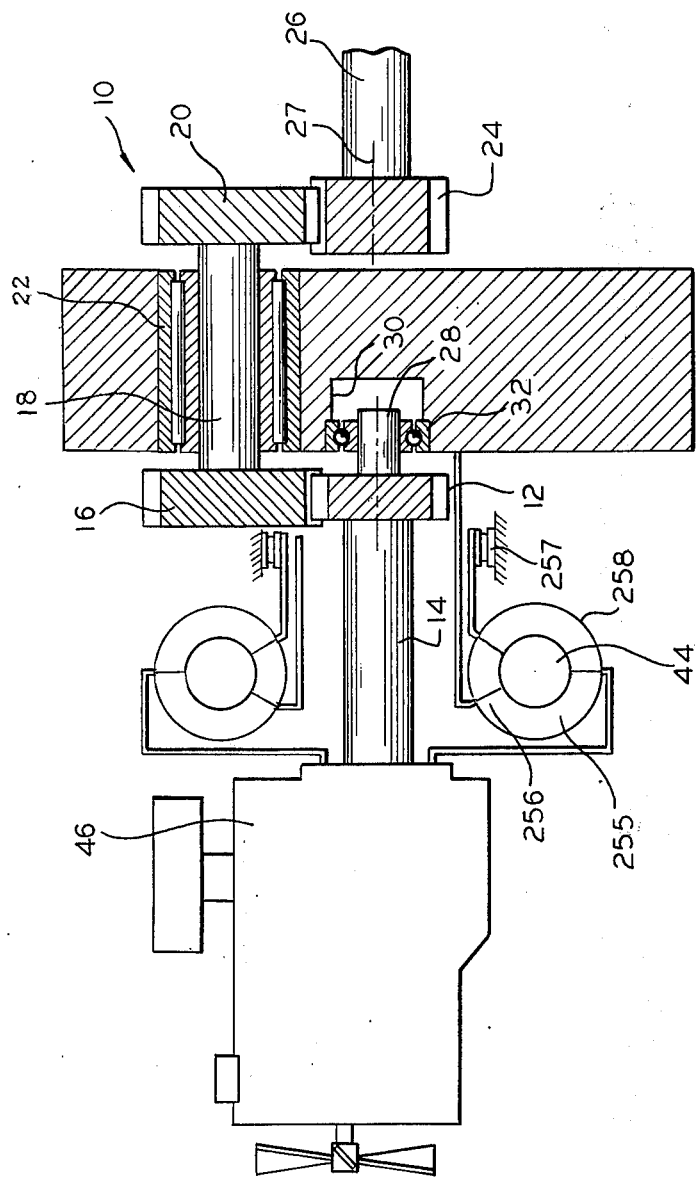
FIG. 10 is a schematic illustration of a system equivalent to that of FIG. 1 utilizing a hydrodynamic torque control device.

The particular system of FIG. 10 utilizing hydrodynamic unit 44' is adapted to drive shaft 26 at variable output speeds increasing the torque while decreasing the speed as the load on shaft 26 is increasing and tending to lug prime mover 46. Obviously, any type of multi-element torque converter may be used as well as any hydrodynamic, mechanical, electrical, fluid torque controlled devices.

With increased load on shaft 26 greater force is exerted between gears 12 and 16, and gears 20 and 24, thereby increasing interaction of all the components. This increased interaction results in torque multiplication to shaft 26 in proportion to the amount of interaction experienced. Thus, an increasing load causes the rotating speed of carrier 22 and turbine 255 to decrease, while increasing the fluid force to reactor 256 to increase and lock up reactor 256 to its housing by means of a typical one-way clutch 257. This results in slippage between turbine 255 and impeller 258 causing, under extreme conditions, the lugging of prime mover 46. Naturally, the hydrodynamic unit may be a fluid coupling or any variation of torque converter including multi-turbine and variable position reactors in clutch means so as to connect the turbine to the impeller or to disconnect the converter.

Figure 2:
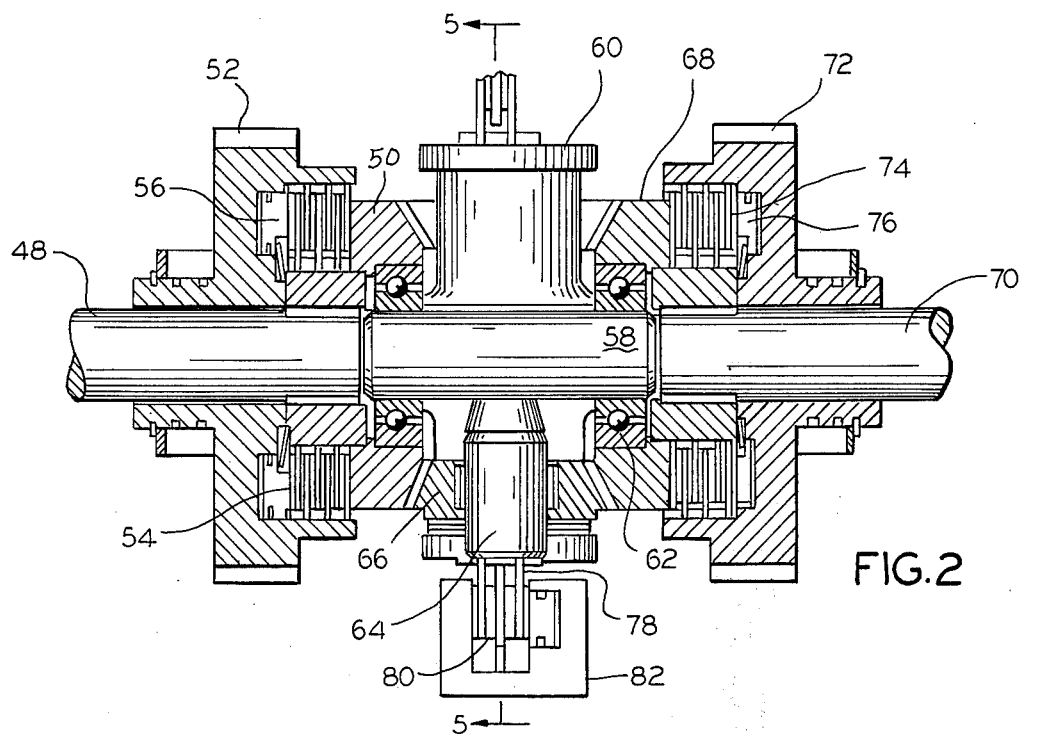
FIG. 2 is an embodiment of my invention incorporating bevel gears and aligned input and output shafts.

Referring now to FIG. 2, there is shown a particular embodiment of my invention adapted for high power, low speed transmission applications. Shaft 48 is an input shaft adapted to be connected to engine 46 (FIG. 1) and driven at a constant speed. First bevel gear 50 is splined to shaft 48 for rotation therewith. An alternate input gear 52 is also rotatably mounted on shaft 48, and adapted to be selectively coupled to bevel gear 50 by means of ring clutch 54. Clutch 54 is operated by introducing hydraulic fluid into chamber 56, and is deactivated by relieving the hydraulic pressure in chamber 56. Input power to bevel gear 50 may alternatively be supplied through shaft 48 or through gear 52 by controlling clutch 54.

Figure 5:
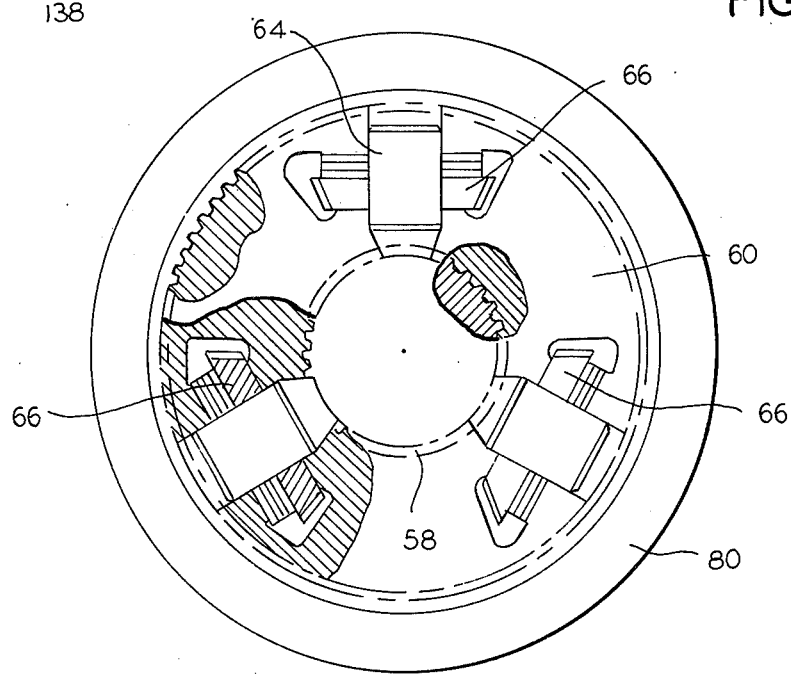
FIG. 5 is a side view of the planetary carrier and bevel gears of FIG. 2, taken at the line 5—5 therein, and shown partly in cross-section.

Shaft 48 includes a portion 58 of lesser diameter, about which is rotatably mounted planetary carrier 60. Ball bearings 62 provide for relative rotation between carrier 60 and shaft portion 58. Carrier 60 includes a plurality of radially mounted shafts 64 about each of which are rotatably mounted bevel gears 66 (FIG. 5). Gears 66 mesh with bevel gear 50, and with bevel gear 68, the latter being splined for rotation with output shaft 70. Alternate output means are provided by gear 72 which is rotatably mounted on output shaft 70, and adapted to be coupled to bevel gear 68 by means of ring clutch 74. Clutch 74 is constructed similarly to clutch 54, and includes a chamber 76 for the application of hydraulic pressure.

Carrier 60 includes a series of ring clutch plates 78 disposed about its outer circumference, which are adapted to be selectively engaged by clutch plates 80 of clutch mechanism 82. Clutch mechanism 82 is part of a control unit similar to that shown at 44 in FIG. 1, and is adapted to impart rotational motion to carrier 60 in either direction, or to selectively hold carrier 60 against rotation.

The operation of the embodiment of FIG. 2, is similar to that of the schematic of FIG. 1. Power is supplied through shaft 48, or gear 52, to drive bevel gear 50. When carrier 60 is held against rotation by control unit 82, thereby holding shaft 64 in a fixed position, power is transmitted through bevel gears 66 to bevel gear 68 to output shaft 70, or alternatively to output gear 72 through clutch 74. When carrier 60 is rotated by control unit 82, the speed of output shaft 70 (or output gear 72) increases or decreases depending upon the speed and direction at which the carrier 60 is rotated. It is apparent that when carrier 60 is rotated in the same direction as that of shaft 48, but at about one-half speed, output gear 68 will not rotate, and the transmission will be in a neutral position. Rotation of the carrier 60 in a direction opposite to that of shaft 48, or restrained, will cause shaft 70 (or gear 72) to be driven in a reverse direction relative to shaft 48. Because of its bevel gear construction, the tranmission of FIG. 2 is highly suitable for high power, low speed applications.

Figure 3:
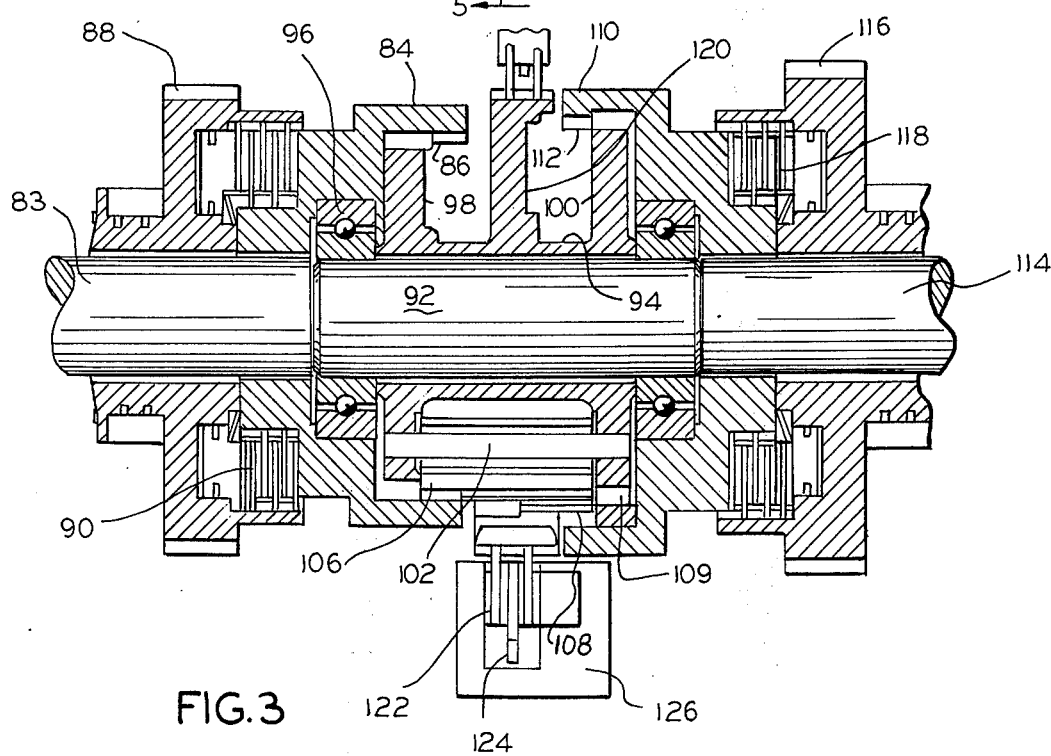
FIG. 3 is yet another embodiment of my invention, incorporating dual planetary spur gears meshing with two annular gears.

FIG. 3 illustrates yet another embodiment of my invention, which is a power transmission adapted for high speed, low power applications. An input shaft 83 is adapted to be driven by engine 46 of FIG. 1, or other suitable prime mover means. Shaft 83 is splined to a first annular gear 84 which includes internally disposed gear teeth 86 thereon. An alternative input gear 88 is rotatably mounted on shaft 83, and is selectively coupled to annular gear 84 by clutch 90.

Shaft 83 includes an extended portion 92 about which a planetary carrier 94 is rotatably mounted on ball bearings 96. Planetary carrier 94 includes two side walls 98, 100, and two shafts 102, 104 extend from one sidewall to the other. Rotatably mounted on each shaft 102, 104 are planet spur gears 106, 108, which mesh with each other. Spur gear 106 also meshes with annular gear 84, while spur gear 108 engages a second annular gear 110, which includes internal gear teeth 112. The pitch diameter of annular gear 110 is different from that of annular gear 84 to provide a varying speed ratio between input shaft 83 and the output shaft 114.

Second annular gear 110 is rigidly fixed to output shaft 114, and may be selectively coupled to output gear 116 by means of ring clutch 118. Output gear 116 is rotatably mounted on shaft 114, and provides an alternate output path for the transmission.

The central portion of carrier 94 includes a radially extending hub 120 terminating in a circumferential extension to which clutch plates 122 are rigidly affixed. Clutch plates 122 are adapted to be engaged by clutch 124, which forms part of control unit 126. Control unit 126 is similar in structure and function to control unit 44 of FIG. 1 and control unit 82 of FIG. 2. Control unit 126 is adapted to selectively drive carrier 94 in either direction about the carrier's central axis, or to hold the carrier against rotation.

The operation of the transmission illustrated in FIG. 3 is similar to the operation of the structure of FIG. 2. Essentially, shaft 83 or gear 88 is driven by engine 46 (FIG. 1), or other suitable prime mover means thereby rotating first annular gear 84. Rotative power is transmitted through spur gears 106, 108 to second annular gear 110. The speed and direction at which annular gear 110 is driven is a function of the gear ratios between the annular gears and the spur gears, which remains constant for any given transmission, and the rotative speed and direction of the planetary carrier 94, which in my invention is a variable factor.

Assuming carrier 94 is held immobile by control unit 126, annular gear 110 and output shaft 114 will be driven in the opposite direction through spur gears 106, 108. The speed of output shaft 114 can be increased or decreased by rotating carrier 94 in one direction or the other by control unit 126. At a given speed and direction of rotation of carrier 94, the speed of output shaft 114 will become zero, or neutral. Continued rotation of the carrier in this direction, but at increased speeds, will reverse the direction of output shaft 114. Thus, the speed and direction of output shaft 114 may be continuously varied by selective activation of control unit 126, while input shaft 83 maintains its substantially constant rotative velocity. By incorporating spur gears, the transmission of FIG. 3 is particularly adapted for high speed, low power applications.

Figure 4:
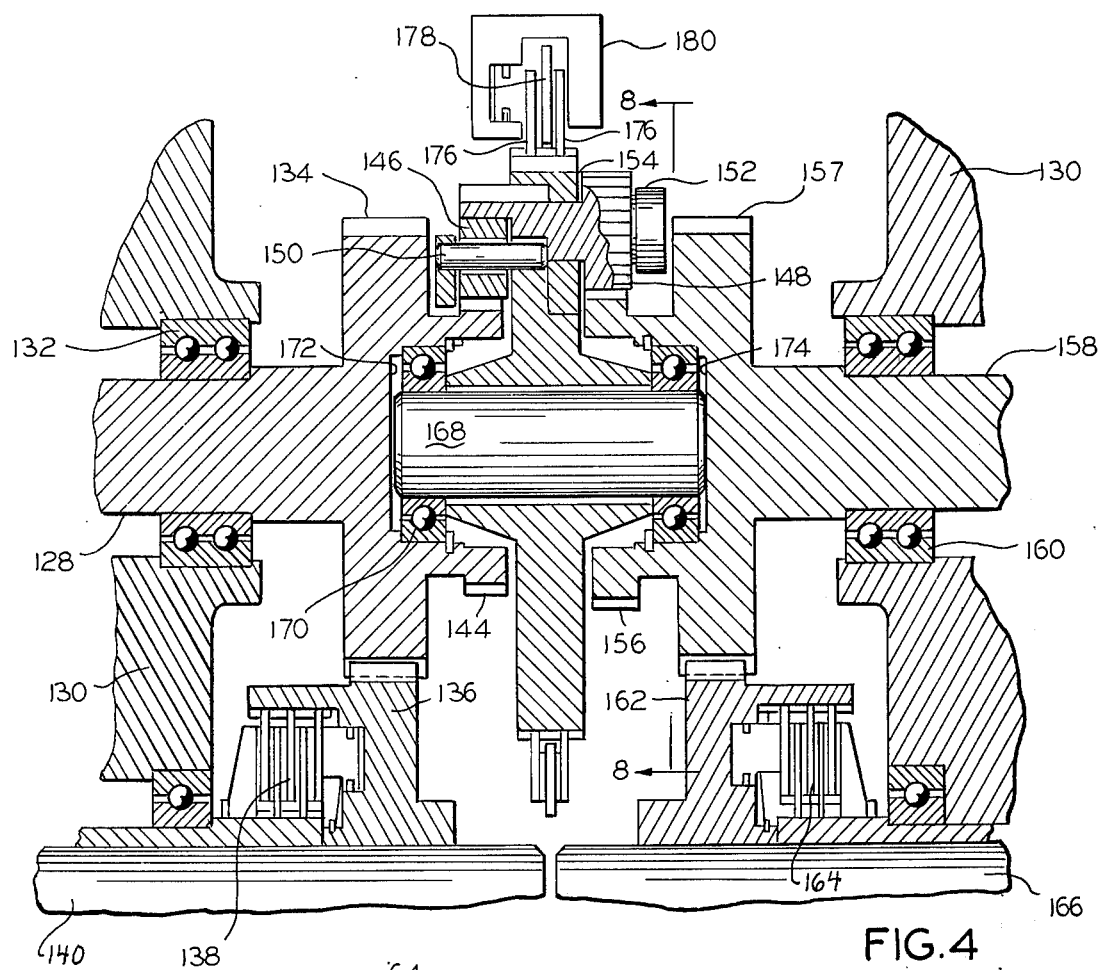
FIG. 4 is an additional embodiment incorporating spur planetary gears meshing with two sun gear power transmission elements.

FIG. 4 illustrates a further embodiment of my invention which is functionally similar but structurally different from the embodiment of FIG. 3. In this embodiment, the input and output shafts of the transmission are connected to spur or sun gears of a planetary gear unit, and the alternate input and output power paths are not co-axial with the primary input and output shafts. Referring to FIG. 4, an input shaft 128 is rotatably journaled in a housing 130 by means of ball bearings 132. Shaft 128 is adapted to be driven by engine 46 (FIG. 1) at a substantially constant rate of speed. An alternate input gear 134 is fixed to shaft 128, and engages gear and clutch unit 136, 138. Gear 136 is rotatably mounted on alternate input shaft 140, and clutch unit 138 is fixed to shaft 140. Thus, when clutch 138 is engaged, gear 136 is fixed for rotation with shaft 140.

Also fixed for rotation with input shaft 128 is spur gear 144, which engages a plurality of planetary spur gears 146. Each gear 146 meshes with a second planetary spur gear 148. (FIG. 8). Spur gears 146, 148 are mounted for rotation about shafts 150, 152, which in turn are held by carrier 154. Planetary spur gear 148 also engages a second or output spur gear 156, which is rigidly fixed to output shaft 158. Shaft 158 is rotatably mounted in housing 130 by means of ball bearings 160. An output spur gear 157 is also fixed to shaft 158 and engages a gear 162 which forms part of a gear-clutch unit with clutch 164. Clutch 164, when engaged. fixes gear 162 to alternate output shaft 166, which is also rotatably mounted in housing 130.

Carrier 154 is mounted for rotation about its central axis by means of shaft 168 which is journaled by means of bearings 170. Bearings 170 hold shaft 168 in recessed portions 172, 174 of shafts 128, 158 respectively. The outer circumference of planetary gear carrier 154 comprises a pair of ring clutch plates 176 which are adapted to engage clutch mechanism 178 of control unit 180. Control unit 180 is similar in structure and function to control units 44, 82 and 126 of FIGS. 1, 2, and 3, respectively.

The operation of the transmission of FIG. 4 is similar to the operation of the structure of FIG. 3. The differences are that power is transmitted through spur gears 144 and 156 (FIG. 4) instead of annular gears 84 and 110 (FIG. 3), and that the alternate input and output paths are not coaxial with the primary input and output paths as in the transmission of FIG. 4.

Figure 6:
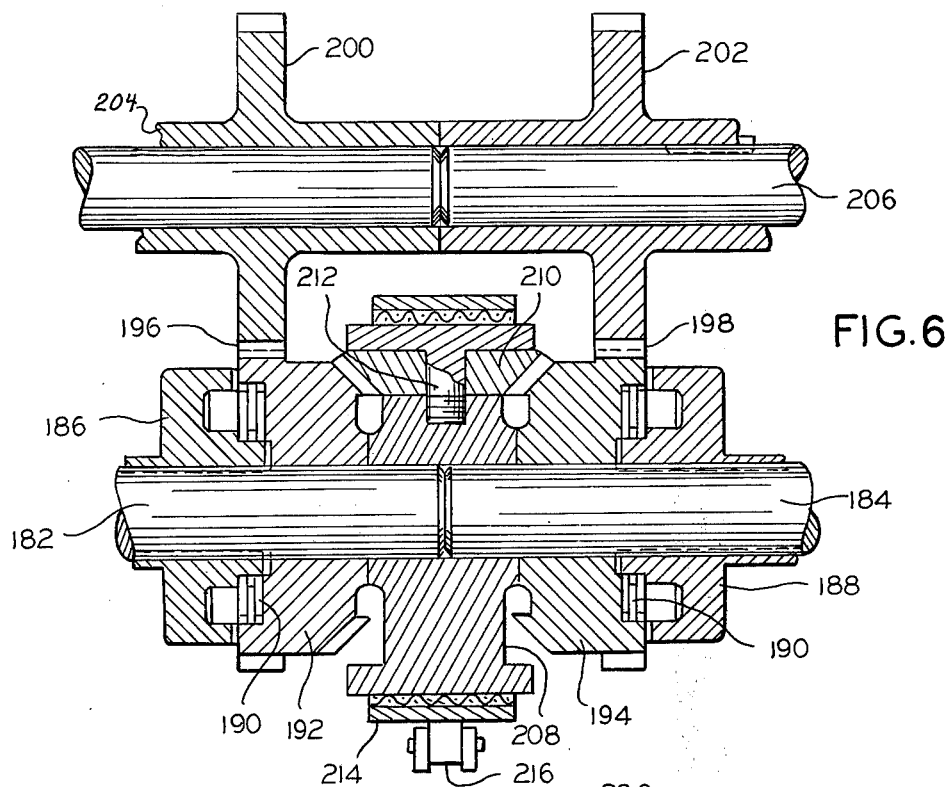
FIG. 6 is a modification of my invention providing dual input and output means operating through a planetary gear mechanism which functions to change the direction of the output means.
Figure 7:
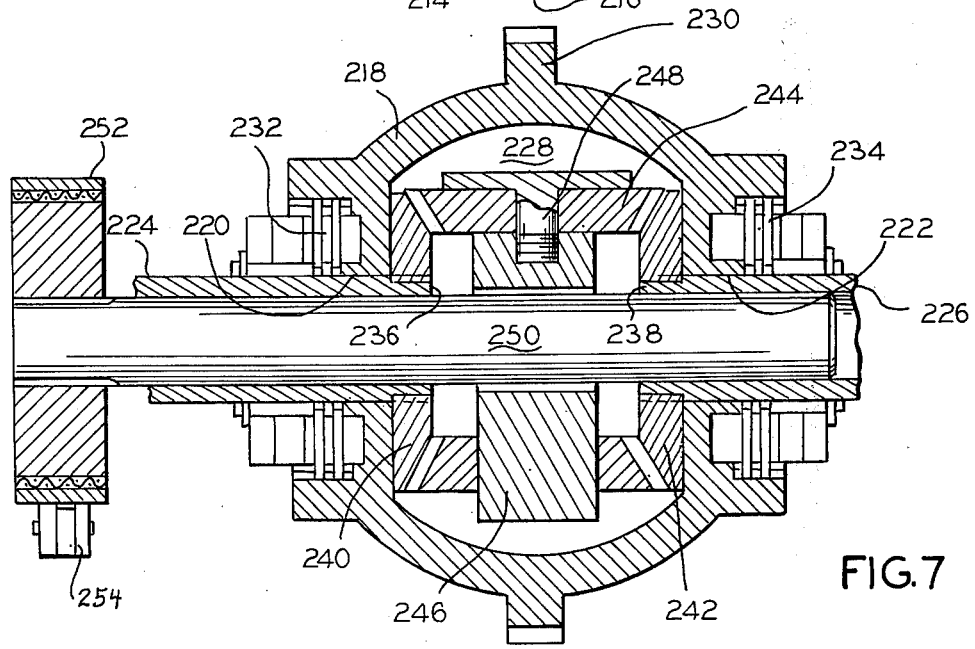
FIG. 7 is an altered form of the transmission illustrated in FIG. 6.

The power transfer structures illustrated in FIGS. 6 and 7 are embodiments of my invention which are particularly suited for dual input-dual output power systems. For example, these transmissions can be utilized to drive tractor tread type vehicles, where steering is provided by altering the speed and/or direction of travel of one of the treads.

Referring to FIG. 6, there is provided a pair of input shafts 182, 184 adapted to be driven by independent power means, or from a single power means coupled to a dual, variable output transfer case. Each shaft 182, 184 has splined thereto a laterally movable clutch pressure plate 186, 188 adapted to selectively engage clutch mechanism 190 fixed to bevel gears 192, 194 the latter being rotatably mounted on shafts 182, 184 respectively. The outer circumference of pressure plates 192, 194 includes spur gear teeth 196, 198, which engage corresponding teeth on output gears 200, 202. Each output gear 200, 202 is drivingly connected to an output shaft 204, 206, which in turn may be connected to the tread drive for a tractor type vehicle such as a tank, by way of example.

Planetary gear carrier 208 is mounted for rotation about its central axis on shafts 182 and 184. Suitable bearing material is provided between carrier 208 and shafts 182, 184 to allow the carrier to rotate substantially friction-free about its mounting shafts. A plurality of planetary bevel gears 210 are mounted on carrier 208 for rotation about shafts 212. Each bevel gear 210 engages bevel gears 192 and 194 simultaneously to form a planetary power path between the respective gears. Surrounding the circumference of carrier 208 is a brake element 214 which is selectively operated by control means 216 to either hold the carrier against movement or to release the carrier for planetary movement. In an alternate embodiment, brake 214 could be converted to an output power path responsive to the speed of carrier 208.

The operation of the transmission of FIG. 6, will be explained in terms of a steering mechanism for a track type vehicle, wherein input shafts 182 and 184 are connected to power generating prime movers, and output shafts 204, 206 are each connected to one of the track drive wheels or gears. It is assumed that shafts 182 and 184 are always driven in the same direction, although their speed may vary. In a mechanical clutch variation, a portion of which is not shown, by moving clutch pressure plates 186, 188 inwardly towards carrier 208, power is delivered through gear teeth 196, 198 to output gears 200, 202, and to shafts 204, 206. The same result is accomplished by pressurizing the chamber in pressure plate 186 and 188. In this mode of operation, control means 216 is operated to disengage brake 214, enabling carrier 208 to rotate about shafts 182, 184.

Track type vehicles are normally steered by reversing the direction of one of the tracks, whereby the vehicle substantially rotates about its central vertical axis. To obtain steering through the transmission of FIG. 6, one of the clutch pressure plates, 188 for example, is moved out of engagement with bevel gear 194, and brake band 214 is tightened by control means 216 to hold carrier 208 immobile. Part of the power from shaft 182 continues to drive output gear 200 and output shaft 204 in a "forward" direction, while the remaining power from shaft 182 is transmitted through bevel gears 210 to drive bevel gear 194 in a "reverse" direction. This causes output gear 202 and output shaft 206 to also rotate in a direction opposite to that of shaft 204, and the tracked vehicle rotates about its center of traction to the degree necessary for steering. The transmission of FIG. 6 is designed for high power, low speed applications in that it uses a beveled gear construction. Clutch mechanism 190 may comprise hydraulic clutches, mechanical clutches, sliding collars, electrical clutches, centrifugal devices, on both sides, one side, or any combination thereof as selected or chosen by one skilled in the art.

The embodiment of my invention disclosed in FIG. 7 is a single input, dual output transmission adapted to drive either of two output shafts in one of two directions from a uni-directional input drive. The transmission includes a cage-like rotatable housing 218 having journaled openings 220, 222 therein. Output shafts 224 and 226 extend from the central space 228 formed internally of housing 218 through openings 220, 222, and housing 218 is mounted for rotation on shafts 224, 226. The outer circumference of housing 218 includes a gear structure 230 through which input power is delivered to the transmission.

Ring clutch means 232 and 234 are disposed between either end of housing 218 adjacent openings 220, 222, and each output shaft 224, 226. When either or both clutch means 232, 234 are engaged, housing 218 is coupled directly to either or both output shafts 224, 226, as the case may be. Thus, with both clutches engaged, power is directly transmitted between gear structure 230 and housing 218 to output shafts 224 and 226.

The transmission of FIG. 7 includes additional structure which permits one of output shafts 224, 226 to be driven in a reverse direction relative to the housing 218 and the remaining output shaft. To this end, each shaft 224, 226 has a portion 236, 238 which extends into space 228. Splined to each of shaft portions 236 and 238 are bevel gears 240, 242, respectively. Each bevel gear 240, 242 simultaneously engages a laterally disposed planetary bevel gear 244 which is mounted for rotation on carrier 246 about shaft 248. Carrier 246 is splined to central shaft 250 which extends from one side of housing 218 through a central core formed in output shafts 224, 226. Suitable bearing means are provided between housing 218 and shafts 224, 226, and between shafts 224, 226 and shaft 250 such that each of these elements may freely rotate with respect to each other.

Rigidly connected to one end of shaft 250 is a brake element 252 which is actuated to hold shaft 250 and carrier 246 against rotation by control unit 254. In operation, the bevel gear carrier, and brake assemblies are adapted to import reverse rotation to one of the output shafts. To accomplish reverse rotation of output shaft 224 as housing 218 is being rotated, for example, clutch means 232 is disengaged so that shaft 224 rotates free of housing 218. Clutch 234 remains engaged, transmitting power to shaft 226 and bevel gear 242. Control unit 254 is engaged to hold shaft 250 and carrier 246 against movement. Rotation of bevel gear 242 causes planetary bevel gear 244 to rotate about shaft 248, driving bevel gear 240 in a direction opposite to that of shaft 226 and housing 218. Since gear 240 is fixed to shaft 236, the latter shaft is driven in a reverse direction relative to housing 218.

When both clutches 232 and 234 are engaged, power is delivered equally to shafts 224, 226, and these shafts are driven in the same direction as housing 218. It is necessary in this mode of operation to release brake 252 to enable shaft 250 and carrier 246 to rotate with the unit.

From the above description it will become apparent, that the device is designed in various ways to produce the purposes for which it is intended, and although I have shown various ways of accomplishing the purposes, I am fully cognizant of the fact that many additional changes may be made without effecting the operativeness of the device, and I reserve the right to make such changes without departing from the spirit of my invention, or the scope of the claims.

Having thus described my invention, what I claim and desire to secure by letters patent in the United States, is:

1. Power transmission apparatus adapted to transmit power between a source of power and an output element including:
   first gear means operably connected to said source of power;
   second gear means operable connected to said output element;
   planetary gear carrier means operably disposed between said first and second gear means, said carrier mounted for rotation about its central axis;
   shaft means associated with said planetary carrier;
   planetary gear means connected to said shaft means and adapted for rotative movement in a circular path about said central axis of said planetary carrier as well as rotative motion about said shaft means;
   control means associated with said planetary carrier means, said control means adapted to control rotative movement of said planetary carrier, whereby movement of said second gear means and said output shaft is determined by the rotative movement of said carrier and said first gear means;
   wherein said control means is adapted to alternatively hold said planetary carrier immobile or to rotate said planetary carrier about its central axis, whereby the speed and direction of said second gear means and said output shaft is determined by the speed and direction of rotation of said planetary carrier.

2. The power transmission apparatus of claim 1 wherein:
   said planetary carrier includes third gear means disposed around the circumference thereof; and
   said control means includes a variable speed power source adapted to drive a fourth gear means, said fourth gear means being in engagement with said third gear means.

3. The power transmission apparatus of claim 1 wherein said first, second, and planetary gear means are bevel gears.

4. The power transmission apparatus of claim 1 wherein said first, second, and planetary gear means are spur gears.

5. The power transmission apparatus of claim 1 wherein said control means includes brake means adapted to selectively hold said planetary carrier immobile, whereby said output shaft is driven in a direction reverse to said input shaft when said brake means is engaged.

6. Power transmission apparatus adapted to transmit power between a source of power and an output element including:
   first gear means operably connected to said source power;
   second gear means operably connected to said output element;
   planetary gear carrier means operably disposed between said first and second gear means, said carrier mounted for rotation about its central axis;
   shaft means associated with said planetary carrier;
   planetary gear means connected to said shaft means and adapted for rotative movement in a circular path about said central axis of said planetary carrier as well as rotative motion about said shaft means;
   said first, second and planetary gear means comprising spur gears,
   control means associated with said planetary carrier means, said control means adapted to control rotative movement of said planetary carrier, whereby movement of said second gear means and said output shaft is determined by the rotative movement of said carrier and said first gear means,
   said carrier including first and second laterally disposed shafts extending therebetween;
   said planetary gear means including first and second planetary spur gears;
   said first planetary spur gears mounted for rotation about said first laterally disposed shaft and in engagement with said first gear means;
   said second planetary spur gear mounted for rotation about said second laterally disposed shaft and in engagement with said second gear means; and
   said first and second planetary spur gears being in engagement with each other.

7. The power transmission apparatus of claim 6 wherein said first and second gear means are annular gears having internal gear teeth.

8. The power transmission apparatus of claim 6 wherein said first and second gear means are spur gears having external teeth.

9. Power transmission apparatus adapted to transmit power between a source of power and an output element including:
   first gear means operably connected to said source power;
   second gear means operably connected to said output element;
   planetary gear carrier means operably disposed between said first and second gear means, said carrier mounted for rotation about its central axis;
   shaft means associated with said planetary carrier;
   planetary gear means connected to said shaft means and adapted for rotative movement in a circular path about said central axis of said planetary carrier as well as rotative motion about said shaft means;
   control means associated with said planetary carrier means, said control means adapted to control rotative movement of said planetary carrier, whereby movement of said second gear means and said output shaft is determined by the rotative movement of said carrier and said first gear means,
   said planetary carrier including pressure engagement means disposed around the circumference thereof, and
   said control means including variable speed power means adapted to drive a clutch means, whereby said clutch means is adapted to engage said pressure engagement means and selectively drive said carrier.

10. Power transmission apparatus adapted to transmit power between a source of power and an output element including:

first gear means operably connected to said source power;

second gear means operably connected to said output element;

planetary gear carrier means operably disposed between said first and second gear means, said carrier mounted for rotation about its central axis;

shaft means associated with said planetary carrier;

planetary gear means connected to said shaft means and adapted for rotative movement in a circular path about said central axis of said planetary carrier as well as rotative motion about said shaft means;

said first, second, and planetary gear means comprising helical gears, control means associated with said planetary carrier means, said control means adapted to control rotative movement of said planetary carrier, whereby movement of said second gear means and said output shaft is determined by the rotative movement of said carrier and said first gear means, said carrier including first and second laterally disposed shafts extending therebetween;

said planetary gear means including first and second planetary helical gears;

said first planetary helical gear mounted for rotation about said first laterally disposed shaft and in engagement with said first gear means;

said second planetary helical gear mounted for rotation about said second laterally disposed shaft and in engagement with said second gear means; and said first and second planetary helical gears being in engagement with each other.

11. The power transmission apparatus of claim 10 wherein said first and second gear means are annular gears having internal gear teeth.

12. The power transmission apparatus of claim 10 wherein said first and second gear means are helical gears having external teeth.

* * * * *